US009278807B2

(12) United States Patent
Drnevich

(10) Patent No.: US 9,278,807 B2
(45) Date of Patent: *Mar. 8, 2016

(54) HYDROGEN STORAGE METHOD AND SYSTEM

(71) Applicant: Raymond Francis Drnevich, Clarence Center, NY (US)

(72) Inventor: Raymond Francis Drnevich, Clarence Center, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 14 days.

This patent is subject to a terminal disclaimer.

(21) Appl. No.: 14/272,795

(22) Filed: May 8, 2014

(65) Prior Publication Data

US 2014/0241802 A1     Aug. 28, 2014

Related U.S. Application Data

(63) Continuation of application No. 13/751,531, filed on Jan. 28, 2013, now Pat. No. 8,757,926, which is a continuation of application No. 12/797,955, filed on Jun. 10, 2010, now Pat. No. 8,425,149.

(51) Int. Cl.
*B65G 5/00* (2006.01)
*C01B 3/00* (2006.01)
(Continued)

(52) U.S. Cl.
CPC ... *B65G 5/00* (2013.01); *C01B 3/00* (2013.01); *C01B 3/34* (2013.01); *C01B 3/48* (2013.01);
(Continued)

(58) Field of Classification Search
CPC .............. B65G 5/00; C01B 3/00; C01B 3/34; F17C 2270/0152; F17C 1/007; F17C 2205/0338
See application file for complete search history.

(56) References Cited

U.S. PATENT DOCUMENTS 2,878,165 A    3/1959 Cottle
3,438,203 A    4/1969 Lamb et al.
(Continued)

FOREIGN PATENT DOCUMENTS

JP          58 191399 A      11/1983
WO     WO 02/097321 A1    12/2002

OTHER PUBLICATIONS

"Hydrogen Reliability Salt Cavern Case Study" Oil Sands Heavy Oil Technologies Conference and Exhibition—Jul. 14-16, 2009, Alberta Canada, available at <http://www.slideshare.net/chojsm1/hydrogen-reliability-cavern-storage>; Published Jul. 20, 2009 ("Slides").
(Continued)

*Primary Examiner* — John Kreck
*Assistant Examiner* — Carib Oquendo
(74) *Attorney, Agent, or Firm* — Iurie A. Schwartz

(57) ABSTRACT

A method and system for storing and supplying hydrogen to a hydrogen pipeline in which a compressed hydrogen feed stream is introduced into a salt cavern for storage and a stored hydrogen stream is retrieved from the salt cavern and reintroduced into the hydrogen pipeline. A minimum quantity of stored hydrogen is maintained in the salt cavern to produce a stagnant layer having a carbon dioxide content along the cavern wall and the top of a residual brine layer located within the salt cavern. The compressed hydrogen feed stream is introduced into the salt cavern and the stored hydrogen stream is withdrawn without disturbing the stagnant layer to prevent carbon dioxide contamination from being drawn into the stored hydrogen stream being reintroduced into the hydrogen pipeline. This allows the stored hydrogen stream to be reintroduced into the hydrogen pipeline without carbon dioxide removal.

13 Claims, 3 Drawing Sheets

(51) Int. Cl.
C01B 3/34 (2006.01)
C01B 3/48 (2006.01)
F17C 1/00 (2006.01)

(52) U.S. Cl.
CPC ......... *F17C 1/007* (2013.01); *C01B 2203/0233* (2013.01); *C01B 2203/0283* (2013.01); *C01B 2203/0288* (2013.01); *C01B 2203/0294* (2013.01); *C01B 2203/043* (2013.01); *F17C 2221/012* (2013.01); *F17C 2221/013* (2013.01); *F17C 2223/0123* (2013.01); *F17C 2223/036* (2013.01); *F17C 2265/068* (2013.01); *F17C 2270/0152* (2013.01); *Y02C 10/14* (2013.01); *Y02E 60/321* (2013.01); *Y02E 60/322* (2013.01); *Y02E 60/324* (2013.01)

(56) References Cited

U.S. PATENT DOCUMENTS

| | | | |
|---|---|---|---|
| 3,807,181 | A | 4/1974 | Kuhne |
| 4,025,321 | A | 5/1977 | Anderson et al. |
| 4,183,369 | A | 1/1980 | Thomas |
| 4,353,214 | A | 10/1982 | Gardner |
| 4,365,978 | A | 12/1982 | Scott |
| 4,444,727 | A | 4/1984 | Yanagihara et al. |
| 4,577,999 | A | 3/1986 | Lindorfer et al. |
| 4,592,677 | A | 6/1986 | Washer |
| 4,626,131 | A | 12/1986 | Glew et al. |
| 4,725,381 | A | 2/1988 | Pinto |
| 4,830,056 | A | 5/1989 | Chamberlain |
| 5,511,905 | A | 4/1996 | Bishop et al. |
| 5,526,280 | A | 6/1996 | Consadori et al. |
| 5,669,734 | A | 9/1997 | Becnel, Jr. et al. |
| 5,842,519 | A | 12/1998 | Sydansk |
| 6,080,306 | A | 6/2000 | Falkner |
| 6,503,299 | B2 | 1/2003 | Baksh et al. |
| 6,511,528 | B1 | 1/2003 | Lansbarkis et al. |
| 6,576,138 | B2 | 6/2003 | Sateria et al. |
| 6,581,618 | B2 | 6/2003 | Hill et al. |
| 6,880,348 | B2 | 4/2005 | Bishop et al. |
| 7,078,011 | B2 | 7/2006 | Morrow et al. |
| 7,152,675 | B2 | 12/2006 | Heard |
| 7,438,079 | B2 | 10/2008 | Cohen et al. |
| 8,425,149 | B2 | 4/2013 | Drnevich |
| 8,690,476 | B2 | 4/2014 | Oates |
| 8,757,926 | B2 | 6/2014 | Drnevich |
| 8,950,419 | B2 | 2/2015 | Oates et al. |
| 2004/0123738 | A1 | 7/2004 | Spencer |
| 2005/0220704 | A1 | 10/2005 | Morrow et al. |
| 2006/0216811 | A1 | 9/2006 | Cunningham et al. |
| 2009/0010714 | A1 | 1/2009 | Bishop |
| 2009/0184517 | A1 | 7/2009 | Mukai |
| 2010/0101789 | A1 | 4/2010 | Dickinson et al. |
| 2010/0163804 | A1 | 7/2010 | Schenck |
| 2010/0200229 | A1 | 8/2010 | Jefferd |
| 2011/0305515 | A1 | 12/2011 | Drnevich |
| 2013/0213479 | A1 | 8/2013 | Oates et al. |
| 2013/0315669 | A1 | 11/2013 | Oates |
| 2014/0161533 | A1 | 6/2014 | Oates |
| 2014/0241802 | A1 | 8/2014 | Drnevich |
| 2015/0101672 | A1 | 4/2015 | Oates et al. |

OTHER PUBLICATIONS

Praxair Extending Hydrogen Pipeline in Southeast Texas—Oil & Gas Journal, vol. 90(34) (1992) (Praxair pipeline).
2006 International Pipeline Conference materials.
16 Tex. Admin. Code§ 3.97 (2007); *Id.* (1994).
Praxair Hydrogen salt cavern schematic from Praxair, Inc. Mechanical Integrity Test, Hydrogen Storage Cavern #1, Sabine Storage 7 Operations, Inc. Project 11-640, Jan. 10, 2012, p. 56 (Cavern Structure).
Praxair Hydrogen Storage Project, TRRC Hearing, Jun. 10, 2004 ("Permit Presentation").
Oil and Gas Docket No. 03-0238823, Examiner's Report and Proposal for Decision, Jul. 28, 2004 ("Permit Review").
Moss Bluff Storage Cavern, Operations and Maintenance Manual, Sep. 16, 2003 ("Ops Manual").
H2 Salt Dome Storage System PFD, Sep. 9, 2003 ("PFD").
Praxair, Inc. Mechanical Integrity Test, Hydrogen Storage Cavern#1, Sabine Storage 7 Operations, Inc. Project 11-640, Jan. 10, 2012 ("5YR MIT").
Stolten, Detlef, ed. Hydrogen and fuel cells: fundamentals, technologies and applications. John Wiley & Sons, 2010 ("Stolten").
Prudential Equity Group Conference, Speaker: Stephen F. Angel, Executive Vice President, Sep. 22, 2005, <http://www.praxair.com/investor-relations/reports-filings-and-presentations/investor-presentations>.
Praxair Commercializes Industry's Only Hydrogen Storage, Oct. 22, 2007 <http://www.praxair.com/news/2007/praxair-commercializes-industrys-only-hydrogen-storage>.
Investment in Gulf Coast to expand facilities and services, Oct. 25, 2007 <http://www.gasworld.com/investment-in-gulf-coast-to-expand-facilities-and-services/2146. article>.
Technology Tutorial by Dr. Joe L. Ratigan ("Technology Tutorial") No date available.
D.J. Evans. 2007. An appraisal of Underground Gas Storage technologies and incidents, for the development of risk assessment methodology. British Geological Survey Open Report, OR/07/023.287 pp. ("BGS").
Nieland JD. (2008). Salt cavern Thermodynamics-Comparison Between Hydrogen, Natural Gas and Air Storage. SMRI Fall Meeting, Austin, Texas, 215-234.
Tek, M. R. (1996). Natural gas underground storage: inventory and deliverability. PennWell Publishing. ISBN: 0878146148; ISBN-13:9780878146147 ("Tek").
CGA G-5.3:1997 Commodity Specification for Hydrogen, Fourth Edition, by Compressed Gas Association, Inc. ("CGA Spec").
Handbook of Compressed Gases (Van Nostrand Reinhold Company)—Hardcover (1990), by Compressed Gas Association, Compressed Gas Association Staff, 3rd ed., ISBN: 0442218818,ISBN-13: 9780442218812 ("CGA Handbook").
"Marks' Standard Handbook for Mechanical Engineers," 9th Edition (1987) (pp. 7-18-7-19); Publisher: The McGraw-Hill Companies; ISBN: 007004127X; ISBN-13: 9780070041271.
"Performance of Palladium Diffusers for Reliable Purification"; (2002) Extended abstract of a paper presented at CS-MAX, San Jose, CA, Nov. 11-13 (pp. 141-143). ("Funke").
Kelley, J.H., and R. Hagler, Storage, transmission and distribution of Hydrogen, Int. J. Hydrogen Energ., 5, 35-54, 1980 ("Kelly").
Lord, Anna S. et al., "A Life Cycle Cost Analysis Framework for Geologic Storage of Hydrogen: A User's Tool", Sandia Report (SAND2011-6221) Sandia National Laboratories (Sep. 2011), 60 pges.
Breele, Y. et al. "Technico-Economic Study of Distributing Hydrogen for Automotive Vehicles". International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10. 1016/0360-3199(79)90005-3 (retrieved on Jan. 1, 1979) p. 297-299, Figure 2.
Foh, Stephen et al., "Underground Hydrogen Storage—Final Report". Inst. of Gas Tech., DOE, Brookhaven Natl Lab, Upton, NY (Dec. 1979).
Foh, Stephen et al., "Underground Hydrogen Storage—Final Report". Inst. of Gas Tech., DOE, Brookhaven Natl Lab, Upton, NY (Dec. 1979) Extracted pp. Title, III, 60, 61, 77, 80 & 81.
Mahoney, J.J. and Strachan, D.M. "Reduction of Sulfate by Hyrogen in Natural Systems: A Literature Review", Pacific Northwest Laboratory, Richland, VA (Jan. 1987, Rev. Jan 1988).
Pottier, J.D. et al. "Mass Storage of Hydrogen"; NATO ASI Series, Series E, Applied Sciences, Hydrogen Energy System: Production and Utilization of Hydrogen and Future Aspects (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132x, pp. 167-170, Figures 1-3, 8.

(56) References Cited

OTHER PUBLICATIONS

Rezunenko et al. "Constructive and Operation of Rock-Salt Underground Helium Concentrate Storage", SMRI Fall Meeting (Oct. 3-6, 1999).
Thoms, R. L. and Gehle, R.M. "A Brief History of Salt Cavern Use", Keynote Speech at Salt 2000 Conference (2000) no month.
Venter, R.D. et al. "Modelling of Stationary Bulk Hydrogen Storage Systems", International Journal of Hydrogen Energy, Elsevier Science Publishers B.V., Barking, GB, vol. 22, No. 8, Aug. 1, 1997, pp. 791-798, XP004075354, ISSN: 0360-3199, DOI: DOI:10.1016/S0360-3199(96)0210-8, pp. 791-793, Tables 1,2.
Adams, J., TransGas Limited "Natural Gas Salt Cavern Storage Operating Pressure Determination". Petroleum Society of CIM, Paper No. 97-180. Presented at Seventh Petroleum Conf. of S. Saskatchewan Section, the Petroleum Society of CIM (Oct. 19-22, 1997) 14 pages.
USPTO Case IPR2015-01071, Patent Trial and Appeal Board Decision, Institution of Inter Partes Review, U.S. Pat. No. 7,078,011 B2.
USPTO Case IPR2015-01072, Patent Trial and Appeal Board Decision, Institution of Inter Partes Review, U.S. Pat. No. 7,078,011 B2.
USPTO Case IPR2015-01073, Patent Trial and Appeal Board Decision, Institution of Inter Partes Review, U.S. Pat. No. 7,078,011 B2.
USPTO Case IPR2015-01074, Patent Trial and Appeal Board Decision, Denying Institution of Inter Partes Review, U.S. Pat. No. 8,690,476 B2.
USPTO Case IPR2015-01075, Patent Trial and Appeal Board Decision, Denying Institution of Inter Partes Review, U.S. Pat. No. 8,690,476 B2.
Valenti, Richard M., Compressed Air Energy Storage (CAES) Act, KCC Rule Development, Kansas Corporation Commission, KCC Open Meeting, Issue 3—Final (Jun. 16, 2010) 49 pages.
Parks, G.D., 2007, ChevronPhillips Hydrogen Cavern Clemens Terminal, www.internationalpipelineconference.com/presentation_Files/1030_PARKS-Clemens_Release-Final.ppt.zip ConocoPhilips. As of Jun. 2007.

HYDROGEN STORAGE METHOD AND SYSTEM

This application is a continuation of prior U.S. application Ser. No. 13/751,531, filed Jan. 28, 2013, which is a continuation of U.S. application Ser. No. 12/797,955, filed Jun. 10, 2010, now U.S. Pat. No. 8,425,149 B2 issued Apr. 23, 2013, which are incorporated herein by reference.

FIELD OF THE INVENTION

The present invention relates to a hydrogen storage method and system in which hydrogen is stored in a salt cavern and introduced from the salt cavern into a hydrogen pipeline without removal of carbon dioxide.

BACKGROUND OF THE INVENTION

Hydrogen is utilized in a variety of industrial processes and is typically produced from the steam methane reforming of hydrocarbons that are contained in natural gas. The hydrogen after production can be used on site where the steam methane reformer is located or can be distributed to customers with the use of a pipeline.

Customer demand will typically vary and it has been found to be advantageous to store the hydrogen when customer demand is low for later use during peak demand periods. One central advantage in storing the hydrogen is that the hydrogen production facility does not have to be sized to meet peak customer demands and thus, can be a smaller, lower cost installation. Additionally, the storage of hydrogen also allows for further profitability in that spot sales of hydrogen can be made to customers, above that required to meet contractual customer demands. Since the storage requirements related to pipeline distribution systems can be at a level of over a billion standard cubic feet of hydrogen, large underground geological formations known as salt caverns are used for such purposes.

Salt caverns are formed by solution mining within large underground formations of salt that can be several hundred to several thousands of feet deep that are generally covered by a cap rock. In order to form the salt cavern, a well is drilled from the surface down to and through the salt formation. The well hole is supported by pipe casings which are surrounded by concrete and a smaller pipe, known as a brine string, is inserted into the casing to introduce water down into the hole. The water dissolves the salt to form the cavern and the resulting brine is pumped to the surface between the annular space formed between the casing and the smaller pipe. Additionally, brine is removed from the cavern by injecting hydrogen to pressurize the cavern and force the brine out through the brine string. When complete, the salt cavern has a roof region at the top of the salt cavern and beneath the cap rock, side regions connecting the roof regions with the bottom of the salt cavern and a residual brine layer or brine sump remaining at the bottom of the salt cavern.

The hydrogen to be stored can be produced at the site of the salt cavern or can be removed from the pipeline itself. The hydrogen is compressed by a compressor and the resulting compressed hydrogen feed stream is introduced into the salt cavern through the casing. When the hydrogen required to meet customer demand is greater than that able to be produced by the hydrogen production facility, the hydrogen is taken from the salt cavern as a stored hydrogen stream through the casings and injected back into the pipeline.

Carbon dioxide as well as other impurities can be introduced into the stored hydrogen stream from the salt cavern itself. The carbon dioxide impurity, as well as moisture, for the most part, evolves from the residual brine layer. Since the pipeline itself will have a specification for the amount of carbon dioxide and also, possibly moisture, that can be contained in the hydrogen that is reintroduced into the pipeline, the carbon dioxide impurity that is introduced into the stored hydrogen stream is removed by an adsorption unit that contains an adsorbent to adsorb the carbon dioxide and also possibly the moisture. For example, in U.S. Pat. No. 7,078,011, a purification system is used in connection with the salt cavern to reduce levels of carbon dioxide and moisture to sufficiently low levels that are necessary to meet the pipeline specification. It has been found that the use of carbon dioxide purification system adds a level of complexity and expense to the operation of an installation that involves the storage of hydrogen within a salt cavern. As will be discussed, it has been found that although unacceptably high levels of carbon dioxide can initially be imparted from the salt cavern to the stored hydrogen stream to be injected back into the pipeline, when the salt cavern is operated in a manner as described in the present invention, carbon dioxide removal will not be necessary.

SUMMARY OF THE INVENTION

The present invention provides, in one aspect, a method of storing and supplying hydrogen to a hydrogen pipeline. In accordance with the method, a feed stream of the hydrogen is compressed to produce a compressed hydrogen feed stream. The compressed hydrogen feed stream is injected into a salt cavern, through at least one conduit, to produce stored hydrogen within the salt cavern and a stored hydrogen stream, composed of the stored hydrogen, is withdrawn from the salt cavern through the at least one conduit. The salt cavern has a residual brine layer located at a bottom region of the salt cavern and side regions extending upwardly from the bottom region of the salt cavern and the at least one conduit has at least one lower end located in an interior region of the salt cavern and spaced above the brine layer and from the side regions of the salt cavern. The stored hydrogen stream is introduced into the hydrogen pipeline, after having been withdrawn from the salt cavern, without removing carbon dioxide present within the stored hydrogen stream.

The compressed hydrogen feed stream is injected into the salt cavern and the stored hydrogen stream is withdrawn from the salt cavern through at least one conduit having at least one lower end located in an interior region of the salt cavern and spaced above the brine layer and from the side regions of the salt cavern. At least a minimum quantity of the stored hydrogen is maintained within the salt cavern before, during, and between times at which the compressed hydrogen feed stream is injected and at which the stored hydrogen stream is withdrawn such that a stagnant layer of hydrogen is maintained that borders the interior region and has at least a bottom portion overlying the residual brine layer and a lateral portion situated along the side regions of the salt cavern. The stagnant layer has a carbon dioxide content that is a potential source of carbon dioxide contamination to the stored hydrogen stream. The flow rates and the velocities at which the compressed hydrogen feed stream is injected into the salt cavern and the stored hydrogen stream is withdrawn the salt cavern are limited such that the stagnant layer is not disturbed and the carbon dioxide contamination of the stored hydrogen stream from the stagnant layer is inhibited.

As a result, for the most part, any carbon dioxide contained in the stored hydrogen stream is a result of the carbon dioxide contained in the salt cavern. However, any such carbon dioxide contamination is at an extremely low level given that it will arise from molecular diffusion of the hydrogen from the stagnant layer to the interior region and such transport of hydrogen is an extremely slow process. As such, carbon dioxide removal is not necessary.

The at least one lower end of the at least one conduit can be spaced below a top region of the salt cavern, located opposite to the bottom region of the salt cavern. In such case, the stagnant layer also has a top portion extending along the top region of the salt cavern and situated opposite to the bottom portion of the stagnant layer. Water can be removed from the stored hydrogen stream prior to injection into the pipeline. Further, the hydrogen feed stream can be compressed to a pressure above the pipeline pressure within the pipeline and as a result, the stored hydrogen has a cavern pressure that is above the pipeline pressure. The stored hydrogen stream can therefore be removed from the salt cavern as a consequence of the cavern pressure and the stored hydrogen stream is reduced to the pipeline pressure prior to injecting the stored hydrogen stream into the pipeline.

In another aspect of the present invention, a system is provided for storing and supplying hydrogen to a hydrogen pipeline. A compressor is provided for compressing a feed stream of the hydrogen to produce a compressed hydrogen feed stream. A salt cavern is incorporated into the system and has a residual brine layer located at a bottom region of the salt cavern and side regions extending upwardly from the bottom region of the salt cavern. At least one conduit is in communication with the salt cavern for injecting the compressed hydrogen feed stream into a salt cavern to produce stored hydrogen within the salt cavern and for withdrawing a stored hydrogen stream composed of stored hydrogen from the salt cavern. The at least one conduit has at least one lower end located in an interior region of the salt cavern and spaced above the brine layer and from the side regions of the salt cavern. A flow network is configured to selectively connect the compressor to the at least one conduit such that the compressed hydrogen feed stream is injected into the salt cavern to produce the stored hydrogen within the salt cavern and to selectively connect the at least one conduit to the hydrogen pipeline such that the stored hydrogen stream is injected into the pipeline without removing carbon dioxide contained in the stored hydrogen stream.

The salt cavern has at least a minimum quantity of the stored hydrogen within the salt cavern before, during, and between times at which the compressed hydrogen feed stream is injected and at which the stored hydrogen stream is withdrawn such that a stagnant layer of hydrogen is maintained that has at least a bottom portion overlying the residual brine layer and a lateral portion situated along side regions of the salt cavern. The stagnant layer has a carbon dioxide content that is a potential source of carbon dioxide contamination to the stored hydrogen stream. A means is provided for limiting the flow rates and the velocities at which the compressed hydrogen feed stream is injected into the salt cavern and the stored hydrogen stream is withdrawn from the salt cavern such that the stagnant layer is not disturbed and the carbon dioxide contamination of the stored hydrogen stream from the stagnant layer is inhibited.

The at least one lower end of the at least one conduit can be spaced below a top region of the salt cavern, located opposite to the bottom region of the salt cavern. In such case, the stagnant layer also has a top portion extending along the top region of the salt cavern and situated opposite to the bottom portion of the stagnant layer. The flow network can be provided with a drying unit positioned within the flow network to remove water from the stored hydrogen stream prior to injection into the pipeline. The compressor compresses the hydrogen feed stream such that the compressed hydrogen feed stream is injected into the salt cavern at a cavern pressure that is above the pipeline pressure. The flow network is configured to reduce the pressure of the stored hydrogen stream to the pipeline pressure prior to injecting the stored hydrogen stream into the pipeline.

In either aspect of the present invention, the at least one conduit can have an injection conduit and a withdrawal conduit. The compressed hydrogen feed stream is injected into the salt cavern through the injection conduit and the stored hydrogen stream is withdrawn from the salt cavern through the withdrawal conduit. The at least one conduit can also comprise an injection conduit having a flow diffuser from which at least the compressed hydrogen feed stream is injected into the salt cavern.

Furthermore, in either aspect of the present invention, the minimum volume of the hydrogen stored within the salt cavern can be maintained at a volume ratio equal to a stored volume of the hydrogen to the actual cavern volume of no less than 29.0 scf/cf. It is to be noted here that, as used herein and in the claims, the unit "scf/cf" means standard cubic feet of the stored hydrogen per actual cubic feet of the cavern volume able to contain the stored hydrogen. The actual cubic feet of cavern volume able to contain the stored hydrogen is computed by subtracting the volume of the residual brine layer from the total volume of the salt cavern. In case the at least one lower end of the at least one conduit is open, rather than incorporating a flow diffuser, the at least one lower end of the at least one conduit can be spaced from the residual brine layer at a lower vertical distance of no less than 250 feet and is also spaced from the side regions of the salt cavern at a lateral distance of no less than 40 feet as measured from a vertical line extending between 10 and 250 feet below the at least one lower end of the at least one conduit. The flow rates and velocities are limited such that, as measured at the at least one lower end of the at least one conduit, the compressed hydrogen feed stream is injected at an injection ratio equal to an injection flow rate of the compressed hydrogen feed stream to the actual cavern volume of no greater than 7.5 scfd/cf and at an injection velocity of the compressed hydrogen feed stream of no greater than 100 feet per second and the stored hydrogen stream is withdrawn at a withdrawal ratio equal to the withdrawal flow rate of the stored hydrogen stream to the actual cavern volume of no greater than 10.0 scfd/cf and at a withdrawal velocity of the stored hydrogen stream of no greater than 150 feet per second. It is to be mentioned that, as used herein and in the claims, the unit "scfd/cf" means the flow rate measured in standard cubic feet per day per cubic feet of the actual cavern volume that is able to store the stored hydrogen.

Where the at least one lower end of the at least one conduit is spaced below a top region of the salt cavern, the at least one lower end can be spaced from the top region of the salt cavern at an upper vertical distance of no less than 50 feet.

In the aspect of the present invention relating to the method, where the hydrogen feed stream contains less than 1.0 ppmv carbon dioxide and less than 8 ppmv carbon monoxide, a sum of a carbon dioxide content and carbon monoxide content in the stored hydrogen stream is to be less than 10 ppmv. Where hydrogen feed stream contains less than 0.1 ppmv carbon dioxide and less than 0.6 ppmv carbon monoxide, a sum of a carbon dioxide content and carbon monoxide content in the stored hydrogen stream is less than 1.0 ppmv. The unit "ppmv" as used herein and in the claims means parts per million by volume on a dry basis or in other words without considering the water content.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
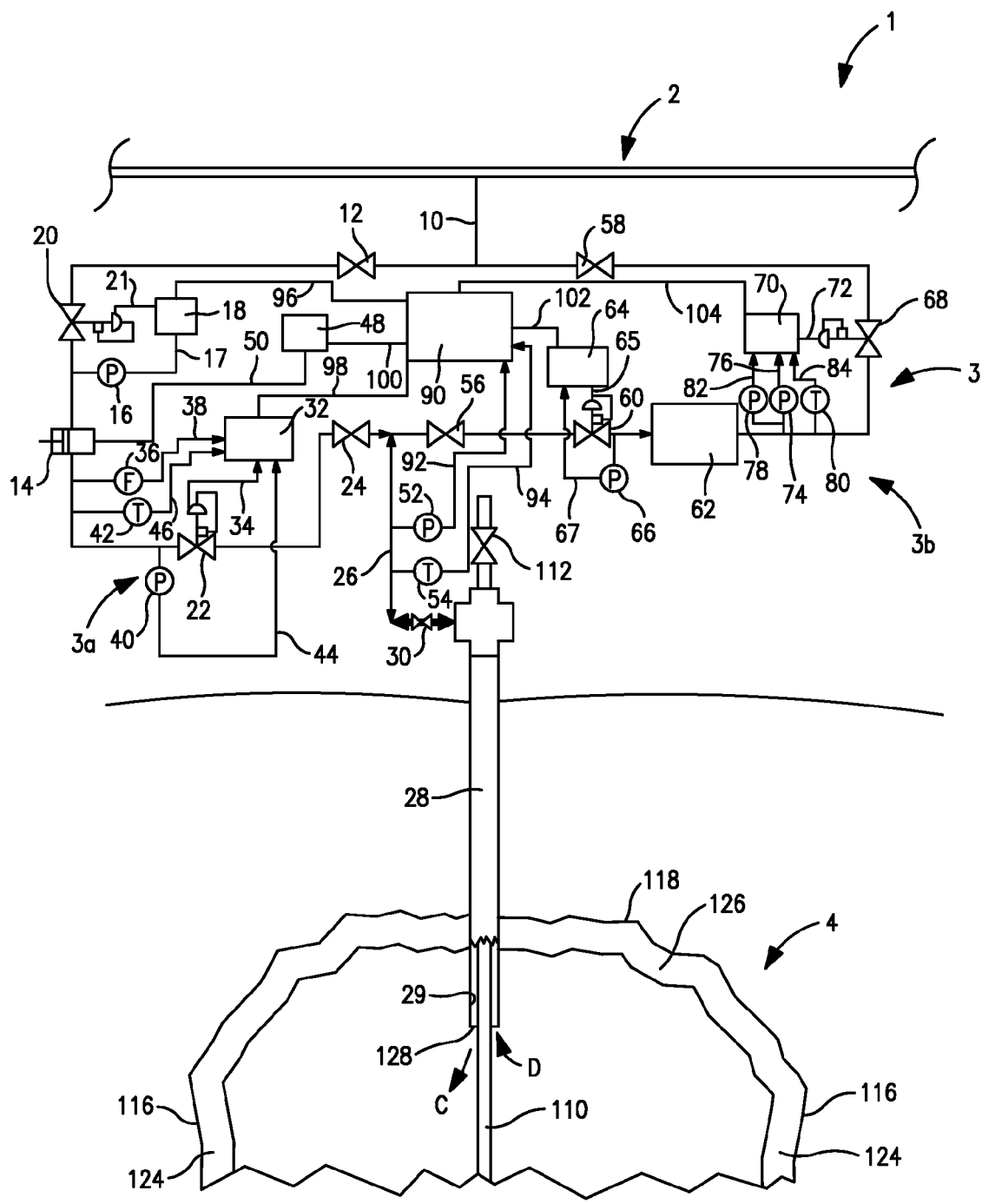
FIG. 1 is a fragmentary, schematic illustration of a system for storing and supplying hydrogen to a hydrogen pipeline that carries out a method in accordance with the present invention.

With reference to FIG. 1 a system 1 is illustrated for storing and supplying hydrogen to a hydrogen pipeline 2. Hydrogen traverses the hydrogen pipeline 2 in a direction taken from point "A" to point "B", from a facility used in generating the hydrogen to customers consuming the hydrogen. The hydrogen generation facility can employ a steam methane reformer to reform a hydrocarbon containing stream into a hydrogen and carbon monoxide containing stream. Such facility typically also uses one or more stages of water-gas shift to react the carbon monoxide with steam and generate additional hydrogen and a hydrogen pressure swing adsorption unit to purify the resulting shifted stream and thereby generate the hydrogen product.

Briefly, the present invention contemplates drawing off a hydrogen feed stream from the hydrogen pipeline 2 during periods of low customer demand and then compressing the hydrogen within a compression side 3a of a flow network 3 to produce a compressed hydrogen feed stream that is injected into salt cavern 4 through a final well casing 28. The compressed hydrogen feed stream is illustrated by arrowhead "C". During periods of high demand or when additional hydrogen can be sold, the hydrogen previously stored in the salt cavern 4, as stored hydrogen, is reintroduced into final well casing 28 as a stored hydrogen stream that is illustrated by arrowhead "D". The stored hydrogen stream, after passage through return side 3b of flow network 3 is reintroduced into hydrogen pipeline 2.

It has been found by the inventors herein that suitable control of the injection, storage and removal of the hydrogen within the salt cavern 4 by the flow network 3 allows the hydrogen to be removed from the salt cavern 4 without having to remove carbon dioxide. In this regard, it has been found that by maintaining a minimum volume of hydrogen within the salt cavern 4, a stagnant layer of hydrogen will be produced that contains carbon dioxide contamination that could be introduced into the stored hydrogen stream to be reintroduced back to the pipeline 2. As will be discussed, the stagnant layer has bottom and lateral portions 124 and 122 and also possibly a top portion 126 that are all shown in FIG. 2. Limiting flow rates and velocities of both the compressed hydrogen feed stream and the stored hydrogen stream will prevent disturbance of such stagnant layer to thereby inhibit the carbon dioxide contamination from being drawn into the stored hydrogen stream.

With specific reference to FIG. 1, a hydrogen feed stream is withdrawn from the hydrogen pipeline 2 through a conduit 10 when it is desired to store hydrogen within salt cavern 4. It is understood, however, that the hydrogen production facility could be located at the site of the salt cavern 4 and in such case, the hydrogen feed stream could be separately produced on site without withdrawal from the hydrogen pipeline 2 or by a combination of withdrawal from the hydrogen pipeline 2 and on-site hydrogen production.

Within the compression side 3a of flow network 3, a valve 12 is set in the open position for purposes of feeding the hydrogen feed stream from the hydrogen pipeline 2 to the salt cavern 4. The hydrogen feed stream is then introduced into a hydrogen compressor 14. Upstream of the hydrogen compressor 14 is a pressure transducer 16 connected to a pressure controller 18 by an electrical connection 17. In response to the pressure sensed by pressure transducer 16, controller 18 operates a proportional control valve 20 by means of an electrical connection 21. The pressure controller 18 is programmed to operate control valve 20 such that the inlet pressure of the hydrogen feed stream to the compressor 14 is maintained at a target pressure. The target pressure is set to ensure that the inlet conditions are consistent with design of compressor 14.

Although not illustrated, further instrumentation could be provided at the inlet of the compressor 14 to measure flow, pressure and temperature of the hydrogen feed stream. The flow would be measured by an orifice meter and the measurement is then corrected by the measured pressure and temperature to determine the flow of the hydrogen feed stream from the hydrogen pipeline 2 for purposes of monitoring the quantity of hydrogen removed from the pipeline and for providing a basis for assessing the integrity of the compression system, for instance, detecting leaks.

The resulting compressed hydrogen feed stream flows through a control valve 22 and a valve 24 that is set in an open position during injection of hydrogen into salt cavern 4. The compressed hydrogen feed stream then flows through transfer line 26 and into an annular space 29 within final well casing 28 from which the compressed hydrogen feed stream enters salt cavern 4. A well head valve 30 connects the final well casing 28 to the transfer line 26. Such valve is left in a normally open position.

As mentioned above, in order to allow the stored hydrogen stream to be introduced into hydrogen pipeline 2 without disturbing the stagnant layer and therefore, without removal of carbon dioxide from the stored hydrogen stream, it is important to limit the flow rate and velocity of the compressed hydrogen feed stream into the salt cavern 4. The flow rate and velocity of the compressed hydrogen feed stream can be limited by selecting a compressor capacity for compressor 14. The flow rate of the compressed hydrogen stream will be limited by such capacity. Since, the annular flow area provided in final well casing 28 (between the inside of final well casing 28 and a pipe 110 known as a brine string) is a known quantity, the limitation of flow rate produced by the compressor 14 will result in the compressed hydrogen feed stream never reaching the limiting velocity that would disturb the stagnant layer. The limiting velocity is calculated by dividing the flow limiting rate of the compressed hydrogen feed stream produced by compressor 14 in actual cubic feet divided by the annular flow area of the final well casing 28. The "actual cubic feet" of the hydrogen is computed at a pressure that would constitute the lowest operating pressure of the salt cavern 4 and the temperature of the compressed hydrogen feed stream leaving the compressor 14 after the after-cooler. Other more sophisticated electronic control systems are also possible.

Within the limit of maximum flow, limited in a manner set forth above, the flow rate of the hydrogen feed stream being withdrawn from hydrogen pipeline 2 must be controlled to control the amount of hydrogen that may be removed from hydrogen pipeline 2 while still allowing the hydrogen pipeline 2 to deliver sufficient hydrogen to meet customer demand. For such purposes, a control valve 22 is provided that is controlled by a controller 32 through a connection 34 and also, controls, to be discussed, that are associated with the compressor 14. Control valve 22 controls the flow by setting the back-pressure to the compressor 14. Controller 32 is a programmable unit that responds to flow measured by an orifice meter 36 through an electrical connection 38. The measured flow is corrected by actual pressure and temperature measurements that are obtained by a pressure transducer 40 and a temperature transducer 42 that are connected to the controller 32 by means of electrical connections 44 and 46, respectively.

Compressor 14 is a reciprocating machine that is sized, as mentioned above, such that the capacity of the machine is less than the maximum allowable flow rate of the compressed hydrogen feed stream to the salt cavern 4. If two or more stages were used in compressor 14, intercoolers would be provided. Although not illustrated, the compressed hydrogen feed stream will typically be cooled by an after-cooler. When sufficient extra hydrogen is available, the salt cavern 4 will be filled at rates consistent with the maximum capacity of the compressor 14. If less extra hydrogen is available from the hydrogen pipeline 2, controller 30 controls control valve 22 to reduce the flow rate of the compressed hydrogen feed stream.

Since reciprocating compressors displace a constant volume of gas regardless of operating conditions, the compressor 14 is generally configured to displace somewhat more gas than is required. Although not illustrated, but as would be well known in the art, compressor 14 is provided with its own flow control system that is connected to a controller 48 by electrical connections generally shown by reference number 50. As discussed above, such control acts in concert with the control of proportional control valve 22 to control the flow of the compressed hydrogen feed stream being injected into the salt cavern 4. Part of such control system associated with the compressor can include a by-pass line. When more volume is compressed than is required, the excess gas may then be sent back to the suction side of the compressor 14 through the bypass line. Another alternative is to simply vent the excess gas that could be flared. Thus, when control valve 22 closes to reduce the flow rate of the compressed hydrogen feed stream, controller 48 would act to open a valve and route the excess gas back to the suction side of the compressor 14 through the by-pass line. In such manner the flow rate hydrogen feed stream being withdrawn from the hydrogen pipeline 2 can be controlled. Alternatively, the controller 48 could be programmed to control the speed of the motor driving compressor 14 to trim the quantity of gas displaced. This is not a typical arrangement since most reciprocating compressors are designed to run at a constant speed. Another mechanism that is often used is to vary the amount of gas that the compressor displaces. This mechanism is effectuated through loading and unloading the compressor. There are two methods of loading and unloading a reciprocating compressor. The first method involves holding the intake valves associated with compressor 14 in an open position. This method in combination with a by-pass line is the preferred mode of control when double acting hydrogen compressors are used. In such method, the controller 48 would act on the intake valves to the compressor 14. The second method involves small pockets or reservoirs that are typically associated with a compressor such as compressor 14 which are opened by valves when unloading the compressor. The gas is compressed into these pockets on the compression stroke and expanded on the return stroke, thereby preventing the compression of any additional gas. Compressors can have multiple clearance pockets per each stage. For example, if four clearance pockets are provided per stage then a five-step flow control can be achieved, namely, full load, three-quarters load, one-half load, one-quarter load and no load. When two stages or more stages are used each stage should be equally loaded to maintain a relatively consistent compression ratio for each stage. If the stages are not equally loaded, then the pressure between the two stages will be either too high or too low and this might result in damage to the compressor 14. In case of such control, the controller 48 would act on valves that would be set in open positions to allow flow into the clearance pockets to in turn control flow of the compressed hydrogen feed stream.

It is to be noted that the compressed hydrogen feed stream is normally compressed to a pressure that is above the pipeline pressure of hydrogen flowing within hydrogen pipeline 2 and as such, the resulting stored hydrogen within salt cavern 4 is at a cavern pressure that is above the pipeline pressure of the hydrogen pipeline 2. The maximum pressure and the minimum pressure, as measured by a pressure transducer 52 within transfer line 26, are set such that the structural integrity of the salt cavern 4 is not compromised. In a manner that will be discussed, the pressure measured by pressure transducer 52 is used in the control of compressor 14. The maximum pressure is set to keep the cavern pressure below the pressure defined by the lithostatic head to prevent fracturing and the minimum pressure is set to prevent the salt cavern 4 from closing in on the storage volume, often called creep. If a high level of creep is allowed the cavern can lose its integrity, and will either lose hydrogen when the cavern pressure is raised or when the cavern pressure is low allow hydrocarbons, carbon dioxide, and other gases that might be present in the surrounding structures to enter the cavern and contaminate the hydrogen or in a worst case, will result in the cavern 4 collapsing. As will be discussed, in the present invention, the minimum pressure is also set to assure that a minimum volume of hydrogen is always stored within the salt cavern 4. A temperature measurement is made by a temperature transducer 54, also for purposes of assuring the minimum volume of stored hydrogen is maintained.

When withdrawing the stored hydrogen from the salt cavern 4, valves 12 and 24 are set in closed positions and valves 56 and 58 are set in open positions. The stored hydrogen, as a consequence of the cavern pressure, flows as stored hydrogen stream through final well casing 28 and transfer line 26 back to the hydrogen pipeline 2 through the return side 3b of flow network 3. As mentioned above, the flow rate and the velocity of the stored hydrogen stream is also limited to prevent disturbance of the stagnant layer and thereby to allow the stored hydrogen stream to be reintroduced into hydrogen pipeline 2 without carbon dioxide removal. This control can be effectuated by appropriate sizing of a proportional control valve 60, to be discussed, through which the stored hydrogen stream flows. The appropriate sizing of such valve, in a manner known in the art, will result in the stored hydrogen stream from never being able to exceed a maximum allowable flow rate and flow velocity within the salt cavern 4 that would disrupt the stagnant layer. The flow velocity would be computed by dividing the limiting flow rate of the stored hydrogen stream in actual cubic feet by the flow area of the final well casing 28. Here, the "actual cubic" feet would be computed at the lowest operating pressure of the salt cavern 4 and at a temperature of the stored hydrogen at the lower end 128 of the final well casing 28 that is an adjusted produced gas temperature based on the local geothermal gradient of the stored hydrogen.

In addition to acting as a flow and velocity limiter for the stored hydrogen stream, the proportional control valve 60 is used in connection with a drying unit 62 to make certain that pressure limitation associated with the drying unit 62 is never exceeded. Proportional control valve 60 is controlled by a pressure controller 64 through an electrical connection 65 that reacts to a pressure sensed by a pressure transducer 66, connected to pressure controller 64 through an electrical connection 67. This pressure control is designed to insure that the pressure of the stored hydrogen stream being fed into drying unit 62 will not exceed the pressure limit of the drying unit 62. Drying unit 62 can use an adsorbent system, a liquid glycol dehydration system, or other drying concepts to remove moisture from the stored hydrogen stream. However, this is optional and in fact, such a unit could be placed on the customer site for such purposes. In fact, if the hydrogen is injected into, stored and withdrawn in accordance with the present invention, the moisture content could be sufficiently low as to not require moisture removal at any location. This would depend upon pipeline specifications for the hydrogen pipeline 2 and requirements of the customer consuming the hydrogen. If drying unit 62 were not employed, the return side 3b of the flow network 3 would be designed by provision of a separate valve coupled with piping pressure losses to produce a pre-specified pressure drop so that maximum flow rates and velocities of the stored hydrogen stream would never exceed a maximum allowable flow rate and velocity in connection with the disturbance of the stagnant layer within the salt cavern 4.

The resulting dried stored hydrogen stream then passes through a proportional control valve 68 that controls the flow of the stored hydrogen stream for purposes of metering the amount of hydrogen that will be redelivered back to the hydrogen pipeline 2. The proportional control valve 68 is controlled by a controller 70 through an electrical connection 72. Controller 70 reacts to flow measured by an orifice meter 74 that is connected to controller 70 by way of an electrical connection 76. The measured flow is corrected within controller 70 through temperature and pressure measurements made by pressure and temperature transducers 78 and 80 that are connected to the controller 70 by electrical connections 82 and 84, respectively. The controller 70 is set with targets in a manner to be discussed that provide the hydrogen flow to the hydrogen pipeline 2 as required to meet the needs of the system 1 with respect to down stream customers and potential spot sales. Thereafter, the stored hydrogen stream passes through valve 58 and back into the hydrogen pipeline 2 through conduit 10.

In the illustrated embodiment, the stored hydrogen stream is driven from the salt cavern 4 by the cavern pressure of the stored hydrogen. Consequently, the return side 3b of the flow network 3 is designed with a pressure drop not only to limit maximum flow rates and velocity of the stored hydrogen stream, but also, to reduce the pressure of the stored hydrogen stream to pipeline pressure of the hydrogen pipeline 2. It is to be noted, that it is possible to further compress the stored hydrogen stream if required. In this regard, it is possible to conduct an embodiment of the present invention in which the cavern pressure would not be sufficient to return the stored hydrogen stream back to the hydrogen pipeline 2. In such case, a compressor would have to be provided for such purposes or compressor 14 could be used after appropriate piping changes.

Control over the minimum volume of hydrogen that is to be maintained within the salt cavern 4 is effectuated by measurement of cavern pressure by pressure transducer 52 and hydrogen temperature by temperature transducer 54 located within transfer line 26 and the actual hydrogen containing volume of the cavern. Pressure transducer 52 and temperature transducer 54 are connected to a supervisory control system 90 by electrical connections 92 and 94, respectively. Supervisory control system 90 can take many forms that are known in the art and no particular form of such control for purposes of the present invention is preferred. For example supervisory control system 90 can incorporate a supervisory control and data acquisition software, that can be obtained from a variety of sources, that is loaded on a dedicated computer that interfaces over a local area network with an automated control system, for example a control system incorporating model predictive control or other automated control of less sophistication. The supervisory control and data acquisition system serves to collects data from the controllers previously discussed, such as controllers 18, 32, 48, 64 and 70 and pressure and temperature transducers incorporated into such controllers, as well as other pressure and temperature transducers such as 52 and 54, generate alarms and etc. The automated control system 90 in turn transmits targets to the controllers which in the illustrated embodiment are in the main pressure targets to control the control valves. The linkages between the controllers 18, 32, 48, 64 and 70 and the supervisory control system 90 are illustrated by electrical connections 96, 98, 100, 102 and 104 respectively. Alternatively or additionally, the supervisory control system 90 could be a human interface to allow an operator to note pressure and temperature readings and manually transmit targets to the controllers.

The volume computation is accomplished within the supervisory control system 90 by applying to the cavern pressure measured by pressure transducer 52, a temperature measurement by temperature transducer 54 when it measures the stored hydrogen leaving the salt cavern 4 to provide the basis for calculating the standard volume of gas in the cavern that fills the actual hydrogen volume in the cavern. In lieu of measuring actual temperature, the temperature to be applied could be an adjusted produced gas temperature based on the local geothermal gradient. A conservative approach involves using the higher of the two temperatures, temperature transducer 54 and the temperature based on the local geothermal gradient. In any case, the measurement of the volume of hydrogen that is derived in a manner set forth above is then compared to a minimum hydrogen volume that must be maintained to maintain the stagnant layer within the salt cavern 4. As a result of such comparison, the removal of stored hydrogen is terminated when the minimum hydrogen volume is approached. As can be appreciated, this can either be done manually or automatically by automated controls incorporated into supervisory control system 90 that would produce targets sent to controllers 64 and 70. It is to be pointed out that the pressure, as measured by pressure transducer 52, is also used as a constraint that is fed to controller 48. Controller 48 is programmed to respond to such pressure and shut down compressor 18 when the pressure exceeds the maximum allowable limit that would compromise the structural integrity of the salt cavern 4. As mentioned above, the flow rate of the compressed hydrogen feed stream could also be stored and used for such calculation.

All controllers 18, 32, 48, 64 and 70 could be proportional, integral and differential controllers that are well known in the art and that can be obtained from a variety of suppliers. Additionally, all of the electrical connections mentioned above with respect to such control or other controllers mentioned herein can either be hard wired or by radio signals. As can also be appreciated, although in the illustrated embodiment of the present invention, the flow rates and velocities of the compressed hydrogen feed stream and the stored hydrogen stream are limited by compressor capacity of the hydrogen compressor 14 and by pressure drop in the return side 3b of flow network 3, the controllers 32 and 72 could also be programmed with constraints that would act as an alternative means of limiting flow rates and velocities.

Figure 2:
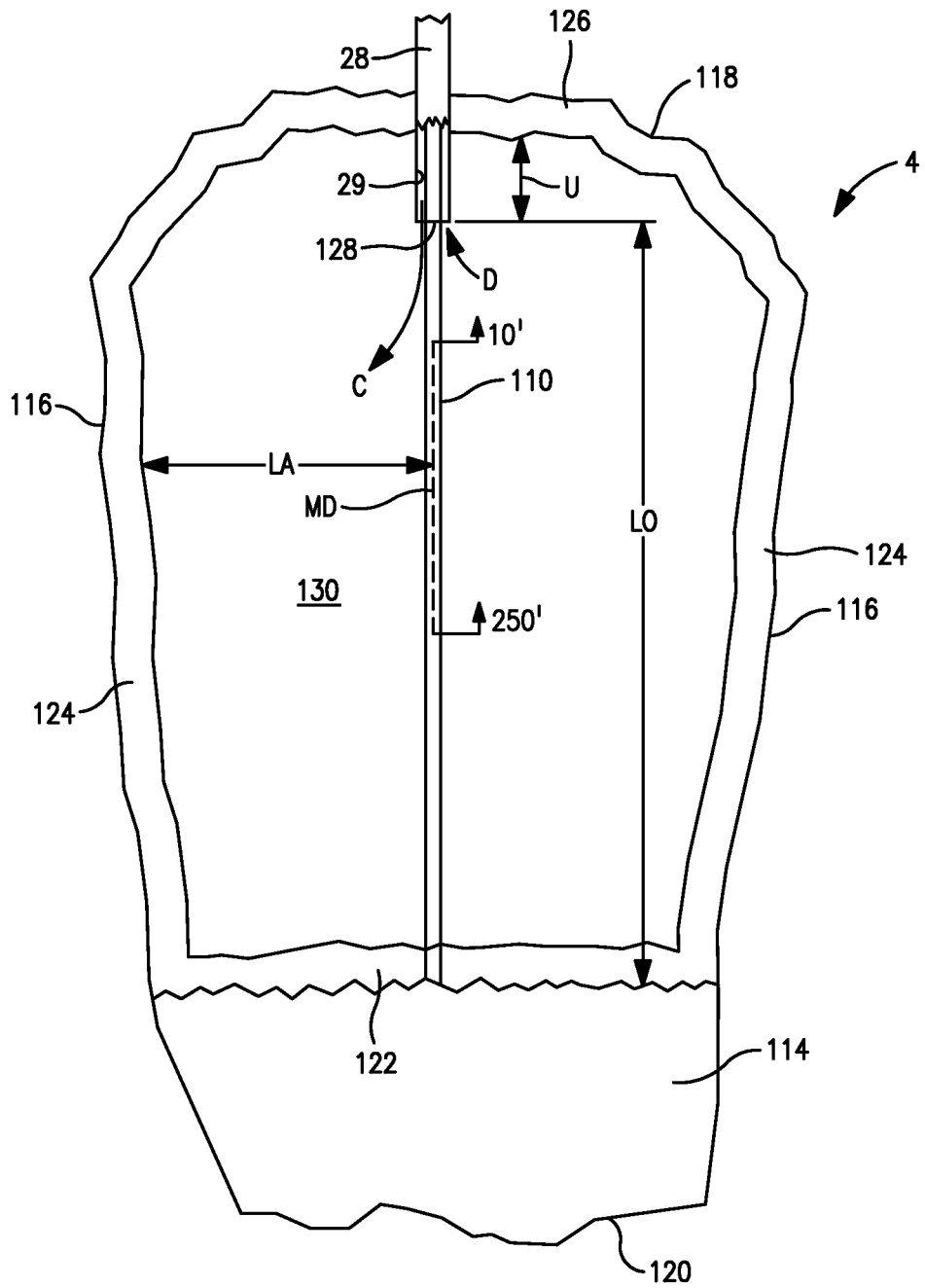
FIG. 2 is a fragmentary, schematic illustration of the system of FIG. 1 showing further details of the salt cavern that is used in connection with the system.

With additional reference to FIG. 2, salt cavern 4 is formed by solution mining in which water capable of dissolving salt is injected through a pipe 110 known as a brine string. The water dissolves the salt and the resulting brine, during the mining operation, is returned through the annular space 29 formed in the final well casing 28 between the inner wall of the final well casing and the pipe 110. As known in the art, the injection of the water and removal of the brine could be alternated so that the water is injected through the annular space 29 formed in the well casing 28 and removed through the pipe 110. After the mining operation is complete, the residual brine in the cavern is removed through pipe 110 by pressure displacement resulting from injection of hydrogen through the final casing 28. Once the brine level reaches the bottom of pipe 110, the pipe is sealed off by a valve 112 which can be seen in FIG. 1. Although not illustrated, but as would be known in the art, the final well casing 28 is cemented in place and penetrates overlying formations known as cap rock. The resulting salt cavern 4 has a residual brine layer 114 also known as a brine sump located in the bottom of the salt cavern 4. The sides of the salt cavern 4 can be said to be defined by a side regions 116. The top and bottom of the salt cavern are defined by a top or roof by a top region 118 and a bottom region 120, respectively.

As has been discussed above, it has been found that the salt cavern 4 can be operated to obviate any need to remove carbon dioxide and therefore, the carbon dioxide content of the hydrogen feed can be very close to that of the stored hydrogen stream reinjected back into the hydrogen pipeline 2. For example, the increase in carbon dioxide content of the stored hydrogen stream over the feed stream of hydrogen 10 can be no greater than 1.5 ppmv and preferably, less than 0.5 ppmv. The maintenance of at least a minimum volume of stored hydrogen at all times, namely before, during and between times at which the compressed hydrogen feed stream is injected into the salt cavern 4 and the stored hydrogen stream is withdrawn from the salt cavern 4 produces a stagnant layer of hydrogen that is also maintained in the salt cavern 4. Preferably, the minimum volume of stored hydrogen that is stored within the salt cavern 4 is maintained at a volume ratio equal to a stored volume of the hydrogen to the actual cavern volume of no less than 29 scf/cf for such purposes. As discussed above, this maintenance of the minimum volume of hydrogen within the salt cavern 4 is provided by pressure and temperature measurements by pressure and temperature transducers 52 and 54 and the actual volume of contained hydrogen in the cavern. As illustrated, the stagnant layer of hydrogen has a bottom portion 122 overlying the residual brine layer 114, a lateral portion 124 situated at the side regions 116 of the salt cavern and a top portion 126 situated at the top or roof region 118 of the salt cavern 4.

As mentioned above, the stagnant layer has a carbon dioxide concentration that is a potential source of contamination to the stored hydrogen stream to be injected back to the hydrogen pipeline 2. The carbon dioxide that is present within the stagnant layer, as contamination to the stored hydrogen stream to be returned to the hydrogen pipeline 2, arises principally from the residual brine layer 114. The carbon dioxide present within the residual brine layer 114 enters the salt cavern 4 from the solution mining water used in forming the salt cavern 4 as well from carbon dioxide, carbonate and bicarbonate contaminants that may have been contained in the dissolved salt and such carbon dioxide remains in the residual brine layer 114. It is also possible that some carbon dioxide can be present within the lateral and top portions 124 and 126 from the cavern wall. However, so long as the stagnant layer is not disturbed during the injection and withdrawal of hydrogen into and from the salt cavern 4, such carbon dioxide contamination of an interior region 130 of the salt cavern 4 that boarders the stagnant layer will be inhibited and as a result, carbon dioxide contamination of the stored hydrogen stream from the carbon dioxide content of the stagnant layer will also be inhibited. The term "inhibited" as used here and in the claims means that any transport of the carbon dioxide contamination from the stagnant layer to the interior region 130 is limited to such contamination arising from the molecular diffusion of the carbon dioxide from the stagnant layer to the interior region 130 of the salt cavern 4. Such molecular diffusion of carbon dioxide is an extremely slow process. In this regard, it has been calculated that if the stagnant layer were produced as described above and the same were left undisturbed, it would take more than 1000 days for the carbon dioxide contamination to diffuse into the interior region 130 to a concentration that is 10% of the concentration of carbon dioxide at the hydrogen brine interface when measured at a level 100 feet above the brine layer 114.

The final well casing 28 is positioned within the salt cavern 4 so that a lower end 128 of the final well casing 28 is situated beneath the top region 118 of the salt cavern 4 to allow the formation of the top portion 126 of the stagnant layer that would be left undisturbed by injection and withdrawal of the hydrogen from the salt cavern. It is possible to practice the present invention with the lower end 128 of the final well casing 28 level or nearly level with the top region 118 of the salt cavern 4. If this were done, then the stagnant layer would not have a top portion 126 that was maintained at all times and potentially, carbon dioxide contamination from the top region 118 of the salt cavern 4 to the interior region 130 of the salt cavern could occur, but carbon dioxide contamination from this region will impact the stored hydrogen to a lesser extent than could result from the bottom region 122 of the stagnant layer.

With respect to the placement of the final well casing 28 or other conduit having a lower open end that does not include a diffuser 136 to be discussed, the lower end 128 of the final well casing 28 should be spaced a lower vertical distance "LO" from the surface of the brine layer 114 that is preferably no less than 250 feet and at a lateral distance "LA" from the side region 116 of the salt cavern 4 of no less than 40 feet as measured from a vertical line extending between 10 and 250 feet below the lower end 128 of the final well casing 28 shown in the drawing as "MD". Additionally, if a top portion 126 is to be maintained, then the lower end 128 should be spaced an upper vertical distance "U" of no less than 50 feet.

The limitation of the flow rate and velocity of the compressed hydrogen feed stream will result in the momentum of the compressed hydrogen feed stream dissipating before reaching the stagnant layer, namely portions 122 and 124 thereof and top portion 126 if present. The limitation on the flow rate and velocity at which the stored hydrogen stream is withdrawn from the salt cavern will ensure that gas velocities are not produced in the stored hydrogen, adjacent the lateral and bottom portions 124 and 122 of the stagnant layer and also, the top portion 126 thereof if the same is present. Preferably, the flow rate of the compressed hydrogen feed stream is limited such that an injection ratio exists that is equal to the injection flow rate divided by the actual cavern volume of salt cavern 4 that is no greater than 7.5 scfd/cf of cavern volume. The injection velocity of the compressed hydrogen feed stream, as measured at the lower end 128 of the final well casing 28 or other conduit used for such purpose, is preferably no greater than 100 feet per second. The flow rate of the stored hydrogen stream can be limited such that a withdrawal ratio of the withdrawal flow rate to the actual cavern volume is no greater than 10.0 scfd/cf. The withdrawal velocity of the stored hydrogen stream, as measured at the lower end 128 of the final well casing or other conduit should preferably be no greater than 150 feet per second. As can be appreciated, such flow rates and velocities are calculated values that will work with the distances "LO", "LA" and "U" discussed above to inhibit carbon dioxide contamination of the stored hydrogen stream. Obviously such flow rates and velocities could change depending upon the placement of final well casing 28 within the salt cavern 4. For example, the closer the lower end 128 of the final well casing 28 or other conduit to the residual brine layer 114, the lower the limiting flow rates and velocities of the compressed hydrogen feed stream and the stored hydrogen stream. In this regard, the minimum volume of hydrogen that would have to be maintained within the salt cavern and the flow rates and velocities could be computed by one skilled in the art by modeling the operation of the salt cavern under consideration by computational fluid dynamics software such as ANSYS CFX software obtained from Ansys, Inc., Southpointe, 275 Technology Drive, Canonsburg, Pa. 15317, USA. This modeling would disclose the flow patterns within the salt cavern during injection and withdrawal of the hydrogen at various flow rates, velocities, placement of the final well casings and cavern pressures. Regions of the salt cavern in which no flow patterns occur define the stagnant layer.

When the present invention is practiced in the manner set forth above, namely, with the positioning of the lower end 128 of the final well casing 28 and the limitation on flow rates and velocities, where the hydrogen flowing within the hydrogen pipeline 2 contains less than 1.0 ppmv carbon dioxide and less than 8 ppmv carbon monoxide, the stored hydrogen stream will be within a typical hydrogen pipeline specification in which a sum of a carbon dioxide content and carbon monoxide content is less than 10 ppmv. However, under a more stringent specification, where the hydrogen flowing within the pipeline will contain less than 0.1 ppmv carbon dioxide and less than 0.6 ppmv carbon monoxide, the stored hydrogen stream will contain a carbon dioxide content and carbon monoxide content that when added together is less than 1.0 ppmv. This being said the present invention has applicability to other pipeline specifications having higher total carbon dioxide and carbon monoxide concentrations.

Although in the prior art, minimum volumes of hydrogen have been maintained within salt cavern that would likely have within the numerical limits set forth above and injection and withdrawal flow rates and velocities have also been used that are likely to have been within the numerical limits set forth above, it has not been appreciated in the prior art that the specific maintenance of such numerical values lead to the formation of a stagnant layer and the prevention of the disturbance of such stagnant layer so that carbon dioxide removal is not required. In fact, carbon dioxide removal was believed to be necessary even when a salt cavern was operated within such limitations.

Figure 3:
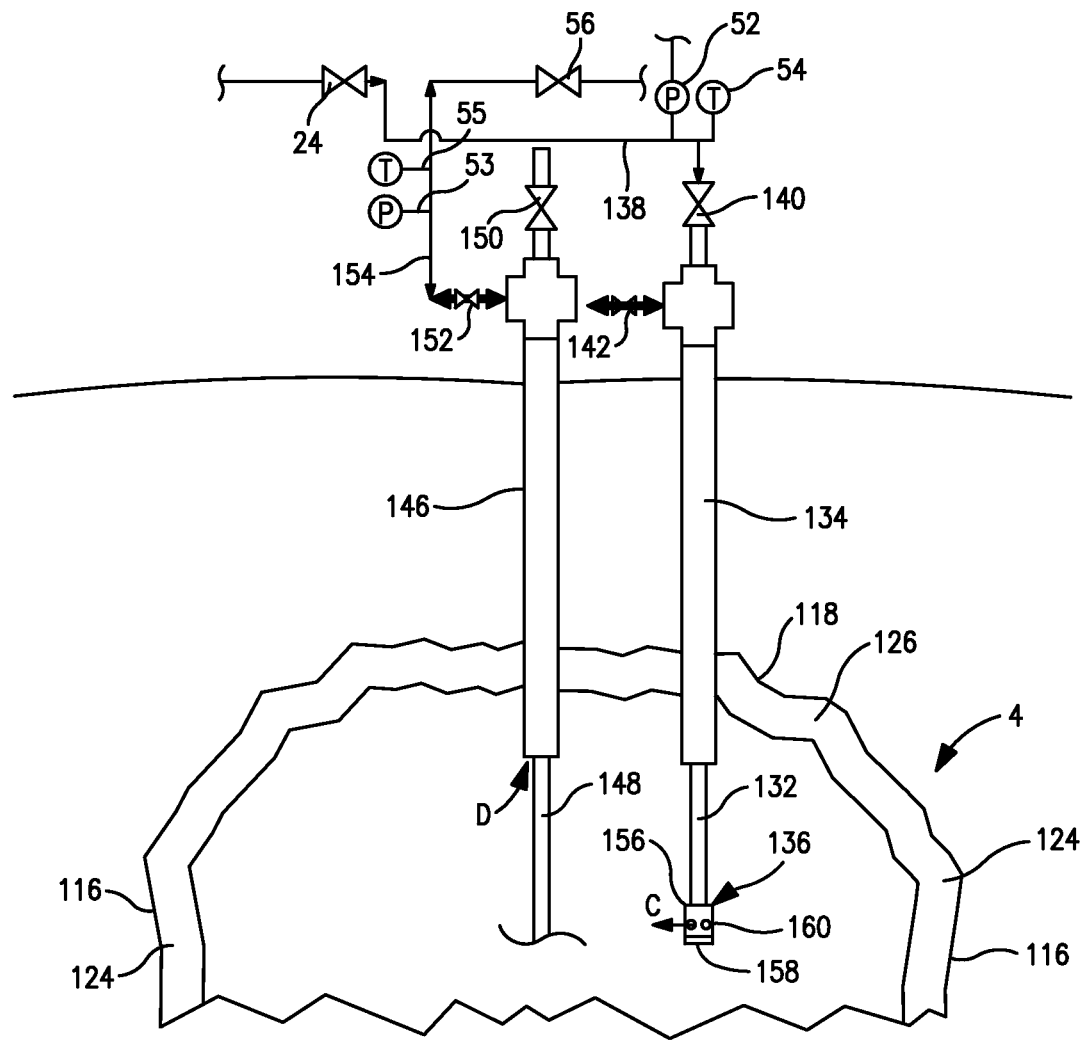
FIG. 3 is a fragmentary, schematic illustration of an alternative embodiment of FIG. 1 showing alternative injection and withdrawal conduits.

With additional reference to FIG. 3, multiple, dedicated conduits can be used for the injection of the compressed hydrogen feed stream and withdrawal of the stored hydrogen stream from the salt cavern 4. Except as noted below, the operation of the system to be used in connection with such conduits is the same as that described with reference to FIGS. 1 and 2 above.

The multiple, dedicated conduits include an injection conduit 132 that is situated within an additional final well casing 134. The lower end of injection conduit 132 is provided with a flow diffuser 136. Injection conduit 132 is formed by a pipe that is inserted within the final well casing 134 that is also set in concrete in the same manner as final well casing 28. The injection conduit 132 is inserted into the final well casing 134 and a transfer conduit 138 communicates between the valve 24, the operation of which was previously described, and a valve 140 that is left in a normally open position. When hydrogen is to be stored in salt cavern 4, valve 24 is set in an open position and valve 56 is set in a closed position and the compressed hydrogen feed stream is supplied from the compressor 14 to the salt cavern 4 through the transfer conduit 138. As illustrated, transfer conduits 138 and 154 are instrumented with the pressure transducers 52 and 53 and a temperature transducers 54 and 55 that function in the manner also discussed above. The pressure and temperature transducers 53 and 55 function to calculate the actual flow rate of the stored hydrogen stream and although not illustrated, would be connected by suitable electrical connections to the supervisory controller 90. A well head casing valve 142 associated with final well casing 134 is set in a closed position. Unlike the embodiments shown and described in FIGS. 1 and 2, the stored hydrogen stream does not flow through injection conduit 132, but rather, from a withdrawal conduit that is formed from a final well casing 146 that is used in connection with mining the salt cavern 4 and as such, has a brine string 148 left in place that is sealed by a valve 150. In this regard, final well casing 146 and brine string 148 are identical to final well casing 28 and brine string 110, previously described. When stored hydrogen is to be supplied back to the hydrogen pipeline 2, valve 24 in a closed position and valve 56 is set in an open position and the stored hydrogen stream flows through a wellhead casing valve 152 to a transfer conduit 154 that is connected to valve 56.

As can be appreciated, the use of dedicated conduits involves the formation of an additional well and etc. However, the provision of the diffuser 136 within the injection conduit has the advantage of lessening any possible disturbance of the bottom portion 122 of the stagnant layer overlying the brine layer 114. In this regard, diffuser 136 is formed by a sleeve 156 that is welded to injection conduit 132 and is closed at its bottom by a plate 158 welded to the sleeve 156. A series of peripheral openings 160 are provided from which the compressed hydrogen feed stream flows into the salt cavern 4. As such, hydrogen is prevented from being expelled directly toward the residual brine layer 114. It is to be noted, however, that in place of the diffuser 136, other designs are possible, for example, more sophisticated devices such as screens or specially designed devices to redirect the linear momentum of the compressed hydrogen feed stream being injected through the injection conduit 132.

The lower end of the injection conduit 132 that is formed by the diffuser 136 should preferably situated no less than 200 feet above the residual brine layer 114 of the salt cavern 4. The reason for such decrease over an open ended conduit such as has been discussed above is that the incoming hydrogen stream is not directed directly at the residual brine layer 114. The preferred limits for the residual hydrogen that is maintained in salt cavern 4, the injection and withdrawal flow rates and velocities are all the same as have been discussed above with respect to FIGS. 1 and 2 except that the velocities are computed on the basis of a different flow area and the injection velocity of the compressed hydrogen feed stream is less than that of the open ended conduit provided by final well casing 28. With respect to diffuser 136, the flow area that would be used in connection with computing the velocity would be the area provided by the peripheral openings 160. The velocity of the compressed hydrogen stream, as measured at such peripheral openings 160, should be less than 50 feet per second. However, it is to be noted that actual velocity and placement limitations will depend on the design of the particular flow diffuser used.

Although in the embodiment discussed above, dedicated injection and withdrawal conduits are utilized for injecting and withdrawing hydrogen, embodiments of the present invention are also possible in which the injection conduit 132 and the flow diffuser 136 are used in connection with withdrawing hydrogen in the same manner as well casing 28 described above in connection with FIGS. 1 and 2. Also possible, as has been discussed above, is to have multiple conduits that are in the form of final well casings 146 or 28 that are either used without a diffuser in parallel or in a dedicated fashion in which one of such conduits is connected to valve 24 for injection of the compressed hydrogen feed stream into the salt cavern 4 and another is connected to valve 56 for the withdrawal of hydrogen from the salt cavern 4. It is also possible to have two pipes such as injection conduit 132 within a single final well casing. This being said, the use of final well casing 28 is used as a conduit for withdrawal and injection of the hydrogen from and to, respectively, salt cavern 4 is convenient because such conduit is in place after the solution mining of the salt cavern 4.

While the present invention has been described with reference to preferred embodiments, as would occur to those skilled in the art, numerous changes, additions and omission can be made without departing from the spirit and scope of the invention as set forth in the appended claims.

I claim:

1. A method of storing and supplying hydrogen to a hydrogen pipeline comprising:
    compressing a feed stream of the hydrogen to produce a compressed hydrogen feed stream;
    injecting the compressed hydrogen feed stream into a salt cavern to produce stored hydrogen within the salt cavern through at least one conduit and withdrawing a stored hydrogen stream, composed of the stored hydrogen, from the salt cavern through the at least one conduit, the salt cavern having a residual brine layer located at a bottom region of the salt cavern and side regions extending upwardly from the bottom region of the salt cavern and the at least one conduit having at least one lower end located in an interior region of the salt cavern and spaced above the brine layer and from the side regions of the salt cavern;
    introducing the stored hydrogen stream after having been withdrawn from the salt cavern into the pipeline;
    maintaining at least a minimum quantity of the stored hydrogen within the salt cavern before, during, and between times at which the compressed hydrogen feed stream is injected and at which the stored hydrogen stream is withdrawn; and
    limiting the flow rates and the velocities at which the compressed hydrogen feed stream is injected into the salt cavern such that, as measured at the at least one lower end of the at least one conduit, the compressed hydrogen feed stream is injected at an injection ratio equal to an injection flow rate of the compressed hydrogen feed stream to the actual cavern volume of no greater than 7.5 scfd/cf and at an injection velocity of the compressed hydrogen feed stream of no greater than 100 feet per second and the stored hydrogen stream is withdrawn at a withdrawal ratio equal to the withdrawal flow rate of the stored hydrogen stream to the actual cavern volume of no greater than 10.0 scfd/cf and at a withdrawal velocity of the stored hydrogen stream of no greater than 150 feet per second such that the stored hydrogen stream is withdrawn from the salt cavern.

2. The method of claim 1, further comprising:
    removing water from the stored hydrogen stream prior to injection into the pipeline.

3. The method of claim 1, wherein the combined carbon monoxide and carbon dioxide content of the hydrogen stored and supplied to the hydrogen pipeline is less than 10 parts per million.

4. The method of claim 1, further comprising:
    compressing the hydrogen feed stream to a pressure above the pipeline pressure within the pipeline;
    storing the hydrogen at a cavern pressure that is above the pipeline pressure;
    removing the stored hydrogen stream from the salt cavern as a consequence of the cavern pressure; and
    reducing the pressure of the stored hydrogen stream to the pipeline pressure prior to injecting the stored hydrogen stream into the pipeline.

5. The method of claim 1, wherein the at least one conduit has an injection conduit and a withdrawal conduit and the compressed hydrogen feed stream is injected into the salt cavern through the injection conduit and the stored hydrogen stream is withdrawn from the salt cavern through the withdrawal conduit.

6. The method of claim 1, wherein the at least one conduit comprises an injection conduit having a flow diffuser from which at least the compressed hydrogen feed stream is injected into the salt cavern.

7. The method of claim 1, wherein the minimum volume of the hydrogen stored within the salt cavern is maintained at a volume ratio equal to a stored volume of the hydrogen to the actual cavern volume of no less than 29.0 scf/cf;
    the at least one lower end of the at least one conduit is open;
    the at least one lower end of the at least one conduit is spaced from the residual brine layer at a lower vertical distance of no less than 250 feet;
    the at least one lower end of the at least one conduit is spaced from the side regions of the salt cavern at a lateral distance of no less than 40 feet from a vertical line extending between 10 and 250 feet below the at least one lower end of the at least one conduit.

8. The method of claim 7, wherein the at least one lower end of the at least one conduit is spaced below a top region of the salt cavern, located opposite to the bottom region of the salt cavern; and
    the at least one lower end of the at least one conduit is spaced from the top region of the salt cavern at an upper vertical distance of no less than 50 feet.

9. The method of claim 7 or claim 8, wherein the hydrogen feed stream contains less than 1.0 ppmv carbon dioxide and less than 8 ppmv carbon monoxide and a sum of a carbon dioxide content and carbon monoxide content in the stored hydrogen stream is less than 10 ppmv.

10. The method of claim 7 or claim 8, wherein hydrogen feed stream contains less than 0.1 ppmv carbon dioxide and less than 0.6 ppmv carbon monoxide and a sum of a carbon dioxide content and carbon monoxide content in the stored hydrogen stream is less than 1.0 ppmv.

11. A method of storing and supplying hydrogen to a hydrogen pipeline comprising:
    compressing a feed stream of the hydrogen to produce a compressed hydrogen feed stream;

injecting the compressed hydrogen feed stream into a salt cavern to produce stored hydrogen within the salt cavern through at least one conduit and withdrawing a stored hydrogen stream, composed of the stored hydrogen, from the salt cavern through the at least one conduit, the salt cavern having a residual brine layer located at a bottom region of the salt cavern and side regions extending upwardly from the bottom region of the salt cavern;

introducing the stored hydrogen stream after having been withdrawn from the salt cavern into the pipeline within the stored hydrogen stream;

maintaining at least a minimum quantity of the stored hydrogen within the salt cavern before, during, and between times at which the compressed hydrogen feed stream is injected and at which the stored hydrogen stream is withdrawn; and limiting the flow rates at which the compressed hydrogen feed stream is injected into the salt cavern such that, as measured at the at least one lower end of the at least one conduit, the compressed hydrogen feed stream is injected at an injection ratio equal to an injection flow rate of the compressed hydrogen feed stream to the actual cavern volume of no greater than 7.5 scfd/cf and the stored hydrogen stream is withdrawn at a withdrawal ratio equal to the withdrawal flow rate of the stored hydrogen stream to the actual cavern volume of no greater than 10.0 scfd/cf.

12. A method of storing and supplying hydrogen to a hydrogen pipeline comprising:

compressing a feed stream of the hydrogen to produce a compressed hydrogen feed stream;

injecting the compressed hydrogen feed stream into a salt cavern to produce stored hydrogen within the salt cavern through at least one conduit and, the salt cavern having a residual brine layer located at a bottom region of the salt cavern and side regions extending upwardly from the bottom region of the salt cavern and the at least one conduit;

introducing the stored hydrogen stream after having been withdrawn from the salt cavern into the pipeline within the stored hydrogen stream;

maintaining at least a minimum quantity of the stored hydrogen within the salt cavern before, during, and between times at which the compressed hydrogen feed stream is injected and at which the stored hydrogen stream is withdrawn; and limiting the velocities at which the compressed hydrogen feed stream is injected into the salt cavern such that, as measured at the at least one lower end of the at least one conduit, at an injection velocity of the compressed hydrogen feed stream of no greater than 100 feet per second and the stored hydrogen stream is withdrawn at a velocity of the stored hydrogen stream of no greater than 150 feet per second.

13. A method for storing hydrogen in a salt cavern connected to a hydrogen pipeline and supplying the stored hydrogen to the hydrogen pipeline comprising:

drawing a hydrogen feed stream from the pipeline;

compressing the feed stream to produce a compressed hydrogen feed stream;

feeding the compressed hydrogen feed stream into an annular space within the salt cavern at a limited predetermined flow rate and velocity wherein the limited flow rate is such that an injection ratio exists that is equal to the injection flow rate divided by the actual cavern volume of the salt cavern that is no greater than 7.5 scfd/cf of salt cavern volume and the injection velocity of the compressed hydrogen feed stream is not greater than 100 feet per second and forming stored hydrogen within the salt cavern;

withdrawing the stored hydrogen from the salt cavern at a predetermined limited flow rate and velocity wherein the limited flow rate is such that a withdrawal ratio of the withdrawal flow rate to the salt cavern volume is no greater than 10.0 scfd/cf and at a velocity is not greater than 150 feet per second;

returning the stored hydrogen to the hydrogen pipeline; and maintaining the pressure within the salt cavern within a maximum pressure and a minimum pressure such that the structural integrity of the salt cavern is not substantially compromised.

\* \* \* \* \*